July 4, 1967
J. A. ROBERTS
3,329,008
LEAK DETECTOR PROBE WITH INTEGRAL FLOW INDICATOR
Filed Nov. 2, 1964
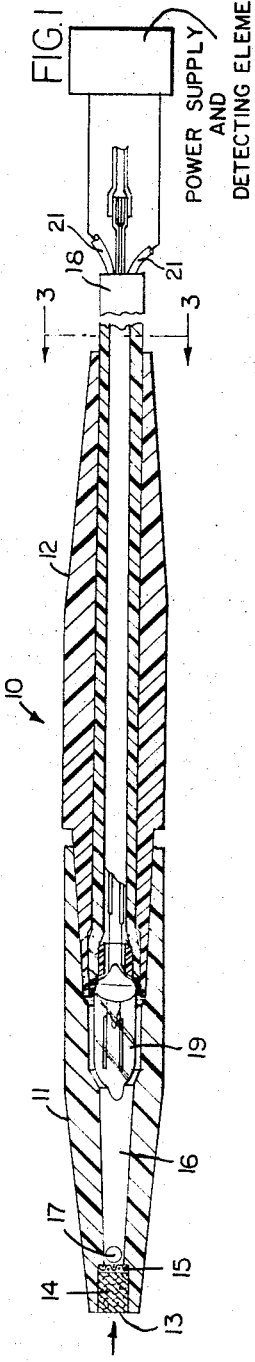
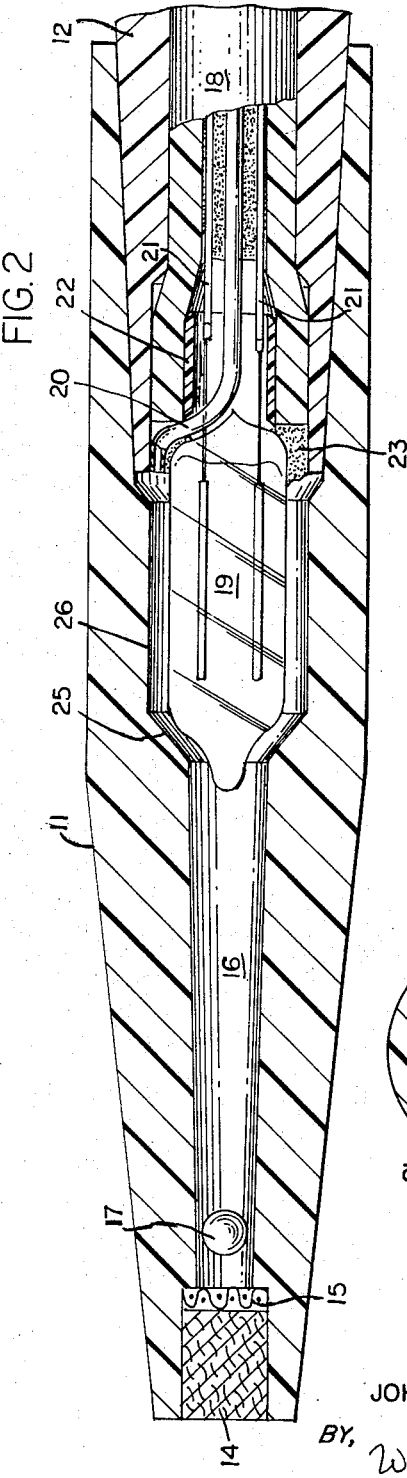
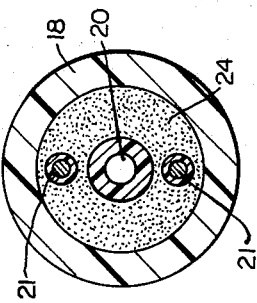
*INVENTOR*
JOHN A. ROBERTS
BY, W. J. Shanley Jr.
*ATTORNEY*

3,329,008
LEAK DETECTOR PROBE WITH INTEGRAL
FLOW INDICATOR
John A. Roberts, Lynnfield Center, Mass., assignor to
General Electric Company, a corporation of New York
Filed Nov. 2, 1964, Ser. No. 408,114
1 Claim. (Cl. 73—40.7)

ABSTRACT OF THE DISCLOSURE

Described is a leak detector probe incorporating a low density sphere in the probe bore between the probe input filter and indicating means for indicating air flow through the probe.

Background of the invention

This invention relates to improvement in leak detectors of the type described in U.S. Patent 3,071,722, granted Jan. 1, 1963, to John A. Roberts, and assigned to the same assignee as the present application.

The aforesaid patent illustrates a commercially successful portable leak detector utilizing a hand-held probe and a pump, sensitive element, and associated circuits which are mounted on the portable chassis. It has been found, during extensive commercial utilization of such leak detectors, that in spite of the utilization of filters, dust and extremely small particles can be ingested into the system without the knowledge of the operator. This interferes with or, in some cases, actually renders the leak detector inoperative. Leak detector operation is interfered with, in certain types of environments, when the system filters gradually become plugged, thus slowly loading down the pump and causing a decrease in air flow through the system. More frequently, it has been found that, unbeknown to the operator, the pump has suddenly become inoperative due to the presence of a very small foreign particle on its valve seats. The occurrence of this phenomenon is completely unpredictable since it has been demonstrated that the leak detector can be run in an extremely dusty environment without having this condition arise.

In addition, other situations can rise that would interfere with the effective operation of a pumping system, e.g., leaks can develop in the system. These situations are not readily ascertainable by the operator when he is probing for leaks because of the extremely low flow rates normally utilized, e.g., .05–.6 cubic foot per hour. Therefore, the operator of the detector of the Roberts patent has no way of knowing, when he is probing for a leak, whether the pump is operative or not. Of course, ultimately the inoperability of the system is detected when the associated leak standard is utilized. However, even when detected the trouble many times is incorrectly diagnosed and results in inopeartive leak detectors being returned to the factory for repair because the operator attributed the inoperability to a failure of the sensitive element or other portions of the circuit when, in actuality, the difficulty arose due to a failure in the pumping system.

Summary

It is therefore an object of my invention to provide a portable leak detector having a flow indicator to permit the operator to verify operability of the pump system.

It is another object of my invention to provide a new and improved leak detector of the type utilizing portable probes by providing a flow rate indicator integral with the probe.

It is yet a further object of my invention to provide a new and improved leak detector of the type utilizing a leak indicator bulb located in the probe for providing leak rate indications by providing a flow rate indicator integral with the probe.

Further objects and advantages of this invention will become apparent as the following description proceeds, and the features of novelty which characterize the invention will be pointed out with particularity in the claim annexed to and forming a part of this specification.

In accordance with the invention, a flow rate indicator is incorporated into a probe of the type providing a visual indication of leak magnitude as an integral part of the probe so that it is in a position such that the operator is able to continuously monitor the air flow in the probe. This assures the operator that he will not unwittingly miss a leak and thus pass a defective device. Furthermore, the positioning of the leak rate indicator in proximity to the flow rate indicator within the probe permits the operator to give his undivided attention to the two indicators during the operation of the detector. In addition, the placement of the two indicators in the tip of the input end of the probe further assures that the operator's undivided attention need only be given the input end of the probe so that he may simultaneously position the input end of the probe at points to be checked while also monitoring both indicators.

Monitoring flow rate can be accomplished as long as the probe is held in a position such that the input end of the flow rate indicator is lower than the remaining portion thereof since the presence of the flow rate indicator above the bottom of the probe is normally an adequate indication that the pumping system is operative.

Thus, in accordance with my invention, I have provided a leak detector which is designed so as to almost assure that no mistakes will be made when being utilized by the average operator. As was previously pointed out, this is due to the cooperation occasioned by the placement of the leak rate and flow rate indicators in the transparent input end of the probe.

Up until this point the description of the flow rate indicator has, in effect, dealt with its use as being essentially an on-off type of indicator for use in continuously monitoring the operability of the pumping system. However, quantitative flow rate measurements are also needed upon a periodic basis for detecting gradual deterioration or change of parameters of components of the pumping system to permit its adjustment to maintain the desired relationship between system sensitivity and response time. The operator of the system might also find it desirable under certain circumstances to change the flow rate in order to obtain a new relationship between sensitivity and response time as dictated by the use to which the detector is being put. As is well known in the art, response time is directly proportional to flow rate while sensitivity is an inverse function of flow rate. Therefore, selection of flow rate is always a compromise between these two criteria.

Such quantitative measurements are obtainable by suspending the probe in a vertical direction while noting the height of the flow rate indicator such as a ball above the bottom of the probe. For convenience, the parameters of the flow rate indicator may be chosen so that the ball will be in the center of the probe at a flow rate corresponding with a sensitivity-response time compromise that is normally utilized. This being the case, the operator thereafter will be able to judge the relationship between the normal and the then-existing sensitivity and response time. This will permit him to properly interpret the operation of the system.

Brief description of the drawing

For a better understanding of the invention, reference may be had to the following specification taken in connection with the accompanying drawings in which:

FIGURE 1 is a sectional view of a leak detector probe of my invention;

FIGURE 2 is an enlarged sectional view of a portion of FIGURE 1; and

FIGURE 3 is a sectional view taken along lines 3—3 of FIGURE 1.

Description of the preferred embodiment

Referring to FIGURE 1, a portable leak detector probe of the subject invention is illustrated as being a generally cylindrical elongated body 10 which comprises a transparent tip portion 11 and an opaque main body portion 12. Transparent portion 11 is provided with an input aperture 13 which contains a filter comprised of a cylindrical piece of felt 14 and a disk-shaped piece of wire screen 15 which is provided to prevent pieces of felt from entering into the system.

The main portion of transparent member 11 has a slightly tapered cylindrical bore 16 which contains a low-density spherical ball 17 therein. It has been found that an acceptable flow rate indicator has been provided when ball 17 has a density .15 times the density of water. Portion 12 of body 10, which may be conveniently formed of an opaque insulator, e.g., black nylon, has a central bore for receiving hose 18 and indicator bulb 19. Referring now to FIGURE 3, hose 18 is illustrated as comprising a thin conduit 20 which is coaxially arranged with respect to the axis of hose 18. This location is selected to provide the best possible protection against the collapse of conduit 20 when the hose is sharply bent. Means is provided by conductors 21 to obtain electrical connections from a power supply to bulb 19 which is mounted in the open end of body portion 12 so that it will be visible when transparent portion 11 is received upon the conical portion of element 12 as illustrated in FIGURE 1. Conduit 20 and conductors 21 are maintained in their illustrated relationship by filler 24.

Referring now to FIGURE 2, the details of construction of the probe near the input end of the probe may be seen. Hose 18 may be secured within body 12 by inserting nylon bushing 22 into the end thereof. In order to bypass indicator bulb 19, conduit 20 is led over the leading edge of hose 18 and body 12 prior to the insertion of bulb 19 in the position illustrated in FIGURE 2. After the terminals of bulb 19 are connected to conductors 21, the bulb may be secured in the open end of body portion 12 in any convenient manner, e.g., it may be cemented by silicone rubber cement 23. The portion of conduit 20 extending beyond the cement may then be cut off. This manner of installation provides a bypass around leak detector indicator bulb 19 so as to permit samples to be drawn into the system.

Surfaces of revolution 25 and 26 of transparent portion 11 are shaped relative to the external surfaces of bulb 19 so as to provide an annular air space for coupling bore 16 to the input of conduit 20. It will be noted that the tip of bulb 19, which is located on the axis of bore 16, serves to limit the motion of ball 17 in that direction. Motion in the other direction will, of course, be limited by the presence of screen 15. Thus, in accordance with my invention, a flow rate indicator is provided due to the novel cooperation between bore 16 of the transparent portion of the probe, the input filter, and the leak rate indicating bulb. Thus, a flow rate indicator is very inexpensively obtained by adding ball 17 to the components normally found in such a probe, e.g., filter and bulb.

In accordance with the invention, the resulting flow rate indicator covers a range of flow rates which will normally encompass all possible desired conditions of operation. It has been found that a flow rate indicator covering the range from .05 to .6 cubic foot per hour will normally suffice. Assuming that the probe is utilized with a detector system in which .4 cubic foot per hour provides an acceptable compromise between sensitivity and response time, the flow rate indicator may conveniently be designed to provide a mid-scale indication at this flow rate. Thus, the operator thereafter can easily determine whether the detector has deviated from this desired flow rate and, if so, how much. The operator can also easily estimate the sensitivity and response time by judging the position of ball 17. Of course, it will be recognized that if more accurate measurements are desired, the flow rate indicator can easily be calibrated in terms of flow rate, sensitivity and/or response time.

While a particular embodiment of the subject invention has been shown and described herein, it is in the nature of description rather than limitation; and it will occur to those skilled in the art that various changes, modifications, and combinations may be made within the province of the appended claim without departing from the spirit or scope of the invention in its broader aspects.

What I claim as new and desire to secure by Letters Patent of the United States is:

In a leak detector system having a pump for drawing air samples through an input aperture of a portable probe and presenting the samples to a conduit means for transmission to an element sensitive to a tracer gas, the improvement of a probe having means for sensing the presence of the tracer gas and means for detecting flow of air samples comprising:

(a) a housing including a transparent portion having a longitudinal bore formed therethrough connecting said input aperture to said conduit means, said bore tapering outwardly from said input aperture to said conduit means;

(b) a bulb mounted on the probe and positioned within said transparent portion in proximity to said bore at said conduit means end and on the longitudinal axis of said bore, said bulb being connected to said detector means to be energized when a tracer gas is present in air samples;

(c) filter means at said input aperture end of said bore for filtering air drawn into said system;

(d) a spherical ball located in said bore, the density of said ball being approximately 0.15, and the diameter of said ball being less than the smallest diameter of said bore, travel of said ball in said bore being limited by said filter means and by said bulb, said ball being sensitive to air flow rates above 0.05 cubic foot per hour.

References Cited

UNITED STATES PATENTS

| | | | |
|---|---|---|---|
| 1,889,705 | 11/1932 | Sherwood | 116—117.2 XR |
| 2,403,897 | 7/1946 | Aller | 73—40 |
| 2,996,661 | 8/1961 | Roberts | 73—40.7 |
| 3,222,921 | 12/1965 | Schreiber et al. | 73—52 XR |

DAVID SCHONBERG, *Primary Examiner.*

LOUIS R. PRINCE, JEFFREY NOLTON,
*Assistant Examiners.*